(12) United States Patent
Ogatsu

(10) Patent No.: US 7,794,232 B2
(45) Date of Patent: Sep. 14, 2010

(54) CARD CONNECTOR AND ELECTRONIC DEVICE

(75) Inventor: Toshinobu Ogatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 270 days.

(21) Appl. No.: 11/817,648

(22) PCT Filed: Mar. 3, 2006

(86) PCT No.: PCT/JP2006/304163

§ 371 (c)(1),
(2), (4) Date: Nov. 7, 2007

(87) PCT Pub. No.: WO2006/093294

PCT Pub. Date: Sep. 8, 2006

(65) Prior Publication Data
US 2009/0081890 A1 Mar. 26, 2009

(30) Foreign Application Priority Data
Mar. 4, 2005 (JP) .............................. 2005-061658

(51) Int. Cl.
H01R 12/00 (2006.01)
(52) U.S. Cl. ..................... 439/64; 439/928.1
(58) Field of Classification Search .............. 439/64, 439/630, 928.1
See application file for complete search history.

(56) References Cited
U.S. PATENT DOCUMENTS 4,810,203 A * 3/1989 Komatsu ................ 439/326
5,535,093 A * 7/1996 Noguchi et al. ........ 361/679.43
6,261,113 B1 * 7/2001 Chen .......................... 439/260
6,695,637 B1 * 2/2004 Liu ............................. 439/377
2004/0137793 A1 * 7/2004 Matsunaga et al. ........ 439/630
2005/0003711 A1 * 1/2005 Chang ....................... 439/630

FOREIGN PATENT DOCUMENTS

| JP | 63-317486 A | 12/1988 |
| JP | 5-35785 A | 5/1993 |
| JP | 7-239924 A | 9/1995 |
| JP | 10-336292 A | 12/1998 |

(Continued)

Primary Examiner—Hien Vu
(74) Attorney, Agent, or Firm—Sughrue Mion, PLLC

(57) ABSTRACT

A card connector where a connector main body is fixed inside an electronic device and a tray is disposed so as to slide relative to the connector main body in a longitudinal direction. The tray is movable between an advanced position at which the entirety of the tray has advanced into the connector main body and a pulled-out position at which a part of the tray has been pulled out from the connector main body. A tilt pawl is disposed on the tray, and a slide groove for guiding the tilt pawl in the longitudinal direction and a tilt groove for guiding the tilt pawl upward at the pulled-out position are formed in the connector main body. When in the pulled-out position, the tray is inclined so that a gap between a card mounting surface of the tray and an upper plate portion of the connector main body is increased. According to the resulting card connector, the electronic device is not required to have a large opening, an excessive load is not applied to the card when the card is inserted or withdrawn, a reduction is size can be achieved, and the profile can be made thinner.

9 Claims, 7 Drawing Sheets

FOREIGN PATENT DOCUMENTS

| | | |
|---|---|---|
| JP | 3121747 B2 | 10/2000 |
| JP | 2001-176607 A | 6/2001 |
| JP | 2001-244004 A | 9/2001 |
| JP | 2003-17183 A | 1/2003 |
| JP | 2004-79494 A | 3/2004 |

* cited by examiner

CARD CONNECTOR AND ELECTRONIC DEVICE

TECHNICAL FIELD

The present invention relates to a card connector that is incorporated into an electronic device, and in which cards are mounted for inputting and/or outputting electronic information to the electronic device, and to an electronic device provided with the card connector.

BACKGROUND ART

Conventionally, techniques have been developed for mounting an IC card in a mobile communication apparatus or other electronic devices and carrying out information exchange between the IC card and the electronic device. In particular, techniques have been developed in recent years in which a SIM (Subscriber Identity Module) card on which subscriber information is recorded is inserted into a mobile communication apparatus, whereby a plurality of communication apparatuses is used by the same subscriber, or a plurality of subscribers uses a single communication apparatus as their own communication apparatus.

A user must be able to easily load and withdraw such a card from the electronic device. For this reason, the card must be detachable from the electronic device, and a card connector that reliably holds the card when the card is mounted and that furthermore assures an electrical connection is disposed between the internal circuitry of the electronic device. There is a need for a card connector that allows a card to be easily mounted and withdrawn and in which the contact points of the electric signals are highly shock-resistant. When information is written to the card or information is read from the card, the information may be written with errors or information may be erased when a shock or another load is applied from the exterior of the electronic device and the card becomes disengaged from the card connector or the electrical connection is lost, even if the card has not become disengaged from the card connector.

Examples of conventional SIM cards incorporated into a mobile communication apparatus include perpendicular contact-point-type connectors (see patent documents 1 and 2, for example), in which the card is inserted and withdrawn by being moved in a direction perpendicular to a contact surface between the terminals of the card and the terminals of a card connector; and insertion-type connectors, in which a card is inserted and withdrawn by being slid in a direction parallel to the contact surface. For insertion-type connectors, there are types in which the card is directly mounted without the use of a tray (see patent document 3, for example), and types in which a dedicated tray is pulled out, the card is placed on the tray, and the tray is inserted (see patent document 4, for example).

[Patent Document 1] Japanese Patent No. 3121747
[Patent Document 2] Japanese Laid-Open Patent Application No. 2001-244004
[Patent Document 3] Japanese Laid-Open Patent Application No. 2003-17183
[Patent Document 4] Japanese Laid-Open Patent Application No. 2004-79494

DISCLOSURE OF THE INVENTION

Problems to be Solved by the Invention

However, the prior art described above has the problems such as those described below. In vertical contact-type card connectors such as those described in patent documents 1 and 2, for example, an opening that is larger than the card must be provided in the casing of electronic device in which the card connector is mounted. As a result, the degree of freedom in designing the electronic device is reduced. In mobile communication devices in particular, which are becoming progressively smaller, the degree of freedom of design is considerably reduced because the ratio of the opening that occupies the entire surface of the casing is large. A technique for accommodating a card on a reverse side of a secondary battery is disclosed in patent document 2, but in this case, the card cannot be removed unless the secondary battery is removed, and the convenience for the user is degraded. The degree of freedom in designing an electronic device is therefore restricted when the card is accommodated on the reverse side of the secondary battery.

In insertion-type connectors such as that described in patent document 3, for example, in which a tray is not used, a mechanism, e.g., a projection, a groove, or the like is provided to the card as such for insertion and removal. Therefore, a mechanism for inserting and removing the card and a mechanism for protecting the card from drops or other impacts must be provided inside the connector. The card connector described in patent document 3, for example, is provided with a very complicated mechanism inside the connector. As a result, this becomes a deterrent to making mobile communication devices smaller and thinner, which are essential requirements.

Furthermore, in such insertion-type card connectors, the internal dimensions of the card insertion portion must be made substantially equivalent to the external dimensions of the card in order to reliably hold the card and achieve an electrical connection. For this reason, the card cannot be inserted smoothly and will be subjected to a buckling load when inserted into the connector, reducing ease of operation. Therefore, an excessive amount of force may be applied to the card or a load may be placed on the card when the card is removed from the connector.

In a card connector provided with a dedicated tray such as that described in patent document 4, for example, the drawer portion of the tray must be made larger than the external dimensions of the card because the card placed in the drawer portion of the tray, and the tray is slid in. For this reason, the card connector that accommodates the tray must also be made considerably larger than the external dimensions of the card, and this is an obstacle to making the electronic device smaller and thinner. This problem is particularly serious in mobile communication devices in which there is a strong demand for smaller and thinner dimensions.

With the foregoing problems in view, it is an object of the present invention to provide a card connector in which a large opening is not required in the electronic device, an excessive load is not applied to the card when the card is inserted or withdrawn, the size can be reduced, and the profile made thinner; and to provide an electronic device provided with the same.

Means for Solving the Problems

The card connector according to the present invention is a card connector which is provided at an electronic device, wherein cards that input and/or output electronic information to and/or from the electronic device are inserted and withdrawn. The card connector comprises a connector main body fixed inside the electronic device; a tray that is movably disposed with respect to the connector main body between a pulled-out position in which a portion of the tray is pulled out from the connector main body and an advanced position in which a portion of the tray is advanced into the connector main body; and inclining means for inclining the tray in the movement direction of the tray so that a gap between the connector main body and a card mounting surface of the tray increases when the tray is in the pulled-out position.

In the present invention, a large opening in the electronic device is not required and the size can be made smaller and thinner because the card is placed in the tray and inserted in the connector main body. Also, the inclining means causes the tray to slope toward the movement direction of the tray so that the gap between the connector main body and the card mounting surface of the tray increases when the tray is in the pulled-out position, and the card can therefore be inserted and removed without excessive force being applied to the card. The length to which the tray is pulled out can be reduced when the card is inserted or removed and the size of the card connector can be reduced. The card is less likely to be damaged because the force applied during insertion and removal is applied to the card itself and not the tray.

Preferably, the inclining means has a pawl disposed in the tray and extended outward in a direction that intersects with the movement direction of the tray; and a tilt groove formed on the connector main body, into which the pawl fits when the tray is in the pulled-out position, and which inclines the tray by guiding the pawl in a direction perpendicular to the card mounting surface. The tray can thereby be made to tilt using simple configuration when the tray is in the pulled-out position.

Preferably, a slide groove is formed extending along the movement direction of the tray in the connector main body; the distal end on the pulled-out position side of the tray is in communication with the tilt groove, and, when the tray moves between the advanced position and the pulled-out position, the tray is guided via the movement of the pawl within the slide groove while engaged therein. The pawl is thereby fixed to the tilt groove when the tray is in the pulled-out position, and ease of operation is high in that the tray does not move when a card is placed on the tray. Also, the tray does not become separated from the connector main body.

The connector main body may have a first base plate portion disposed below the tray; a pair of first side plate portions that stand upwardly erect from two edges that extend in the movement direction of the tray in the first base plate portion; and an upper plate portion extended inward from the upper end of the first side plate portions;

the tray may have a second base plate portion in which the upper surface thereof constitutes the card mounting surface; and a pair of second side plate portions stand upwardly erect from two edges that extend in the movement direction of the tray in the second base plate portion;

the tilt groove is formed from the first side plate portion across the upper plate portion, and guides the pawl in a direction away from the first base plate portion;

the pawl may be formed on the second side plate portion;

the first side plate portion and the upper plate portion may extend further to the pulled-out position side from the first base plate portion; and the edge on the pulled-out position side in the first base plate portion may be disposed further to the pulled-out position side than the tilt groove. Preferably the tray has an elastic member for urging the portion where the pawl is disposed in the tray toward a direction away from the first base plate portion when the tray is in the pulled-out position. The tray can thereby be reliably caused to slope when the tray is in the pulled-out position.

A lock groove is preferably formed in the connector main body, and a lock pawl that fits into the lock groove when the tray is in the advanced position is provided to the tray. The card can thereby be securely held and an electrical connection maintained, and the card can be reliably protected.

It is also possible for the connector main body to have a plurality of contact point terminals for connecting terminals of the card to the internal circuitry; and an insulation plate in which the plurality of contact point terminals is embedded and which insulates the plurality of contact point terminals from each other; and that notches be formed in positions that correspond to the terminals of the card in the tray.

The card connector according to the present invention may have a contact point component fixed inside the electronic device, wherein the contact point component has a plurality of contact point terminals for connecting terminals of the card to the internal circuitry, and an insulation plate in which the plurality of contact point terminals is embedded and which insulates the plurality of contact point terminals from each other; and wherein notches are formed in positions that correspond to the terminals of the card in the tray. The connector main body and the contact point components can thereby be manufactured as separate components, the contact point components can be designed as multipurpose components, and the connector main body can be separately designed in accordance with the specification of the electronic device in which the card connector is mounted.

Preferably, the connector main body has a first base plate portion disposed below the tray; and the tray has a second base plate portion whose upper surface constitutes the card mounting surface, the total thickness of the first and second base plate portions being equal to the height of the contact point terminals. The card connector can thereby be made thinner.

The electronic device according to the present invention is characterized by having the card connector. The electronic device according to the present invention may be a mobile communication device and the card may be a SIM card.

Effect of the Invention

According to the present invention, the tray is made to slope when in a pulled-out position so that a larger gap will be formed between the card mounting surface of the tray and the upper plate portion of the connector main body. According to the resulting card connector, the electronic device is not required to have a large opening, an excessive load is not applied to the card when the card is inserted or withdrawn, a reduction is size can be achieved, and the profile can be made thinner.

DESCRIPTION OF THE REFERENCE NUMERALS

Figure 1:
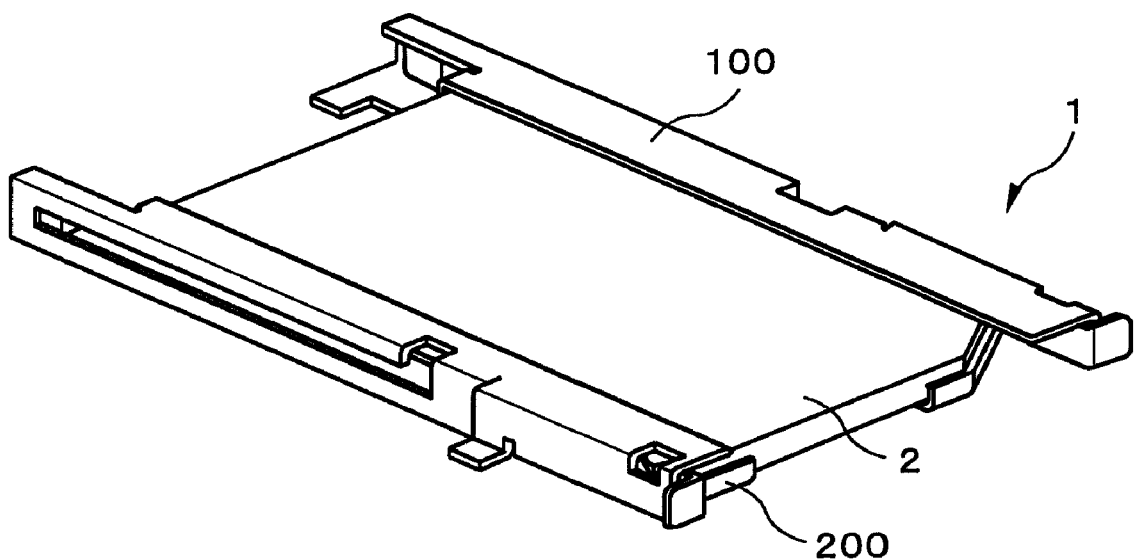
FIG. 1 is a perspective view showing the card connector according to the first embodiment of the present invention.

1 Card connector
2 SIM card
100 Connector main body
100a Base plate portion
100b Side plate portion
100c Upper plate portion
101 Notch
102 Tilt spring notch
103 Fixed portion
104 Insulating resin plate
105 Contact terminal
106 Slide groove
107 Tilt groove
108 Fixed part
109 Lock groove
110 Stopper
111 Guide
121 Tilt pawl
200 Tray
200a Base plate
200b Side plate
201 Contact notch
202 Card bracket
203 Tilt spring
204 Notch
205 Cutout
206 Card bracket
207 Slide pawl
208 Tilt notch
209 Lock hinge
210 Lock pawl
211 Lock tab
300 Connector main body
300a Base plate
300c Upper plate
301 Contact part notch
302 Holding rib
400 Contact part

BEST MODE FOR CARRYING OUT THE INVENTION

The embodiments of the present invention are described in detail below with reference to the accompanying drawings. Embodiment 1 of the present invention will be described first.

Figure 2:
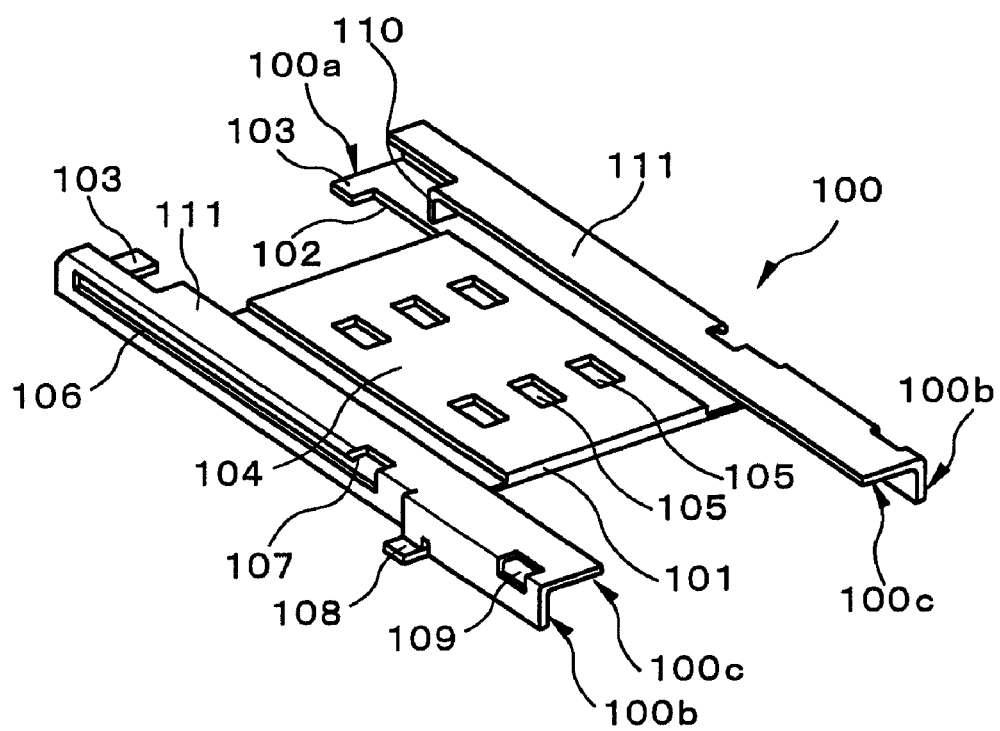
FIG. 2 is a perspective view showing the connector main body of the card connector.
Figure 3:
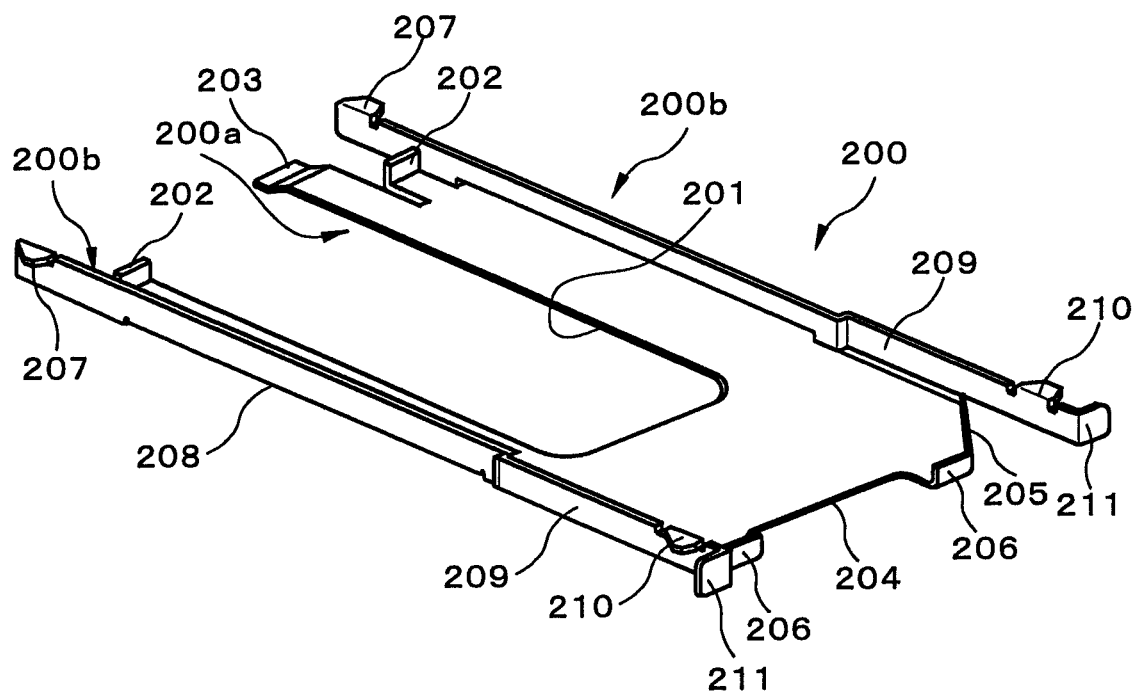
FIG. 3 is a perspective view showing the tray of the card connector.

FIG. 1 is a perspective view showing the card connector according to the present embodiment; FIG. 2 is a perspective view showing the connector main body of the card connector; and FIG. 3 is a perspective view showing the tray of the card connector. The card connector according to the present embodiment is mounted in an electronic device, e.g., a mobile communication apparatus, and a SIM card is inserted and withdrawn from the electronic device.

As shown in FIG. 1, the card connector 1 according the present embodiment is an assembly composed a connector main body 100 and a tray 200, and is configured so that a SIM card 2 is internally mounted. The connector main body 100 is mounted on a mounting board (not shown) inside the electronic device, and is fixed inside the electronic device. The SIM card 2 is in the shape of a substantially rectangular plate, and one corner of the rectangular shape is diagonally trimmed away. The tray 200 is configured so as to slide relative to the connector main body 100 in the lengthwise direction, and can move between an advanced position in which the entire tray 200 advances inside the connector main body 100 and a pulled-out position in which a portion of the tray 200 is pulled out from the connector main body 100.

The configuration of the connector main body 100 will be described first. As shown in FIG. 2, the connector main body 100 has a cross-sectional C shape orthogonal to the lengthwise direction, and is composed of a rectangular base plate portion 100a, a pair of side plate portions 100b that stands erect from the long side portion of the base plate portion 100a, i.e., upward from the two edges extending in the movement direction of the tray, and a pair of upper plate portions 100c that extends from the upper end portion of the side plate portions 100b in a mutually approaching direction. The upper plate portions 100c are not connected to each other and the area between the upper plate portions is open. The configuration of the connector main body 100 has plane symmetry about the center of the connector main body in the crosswise direction in relation to a virtual plane that is orthogonal to the crosswise direction and parallel the lengthwise direction.

The base plate portion 100a is not disposed at one end of the connector main body 100 in the lengthwise direction, and a notch 101 is formed in this location. The center area in the crosswise direction of the base plate portion 100a is cut away at the other end portion in the lengthwise direction of the connector main body 100, and a tilt spring notch 102 is formed in this location. A pair of fixed portions 103 extending toward the interior of the tilt spring notch 102, i.e., the center area in the crosswise direction of the base plate portion 100a is disposed on both sides of the tilt spring notch 102 at the other end of the base plate portion 100a in the lengthwise direction. Hereinafter, the notch 101 side in the lengthwise direction of the connector main body 100 will be referred to as the front side, and the tilt spring notch 102 side will be referred to as the rear side. The advanced position of the tray 200 described above is located on the rear side with respect to the pulled-out position, and the pulled-out position of the tray 200 is located on the front side with respect to the advanced position. This configuration will be described in detail below.

An insulating resin plate 104 composed of an insulating resin is disposed in the center area of the crosswise direction of the base plate portion 100a, and six, for example, contact terminals 105 are embedded in the surface of the insulating resin plate 104. The edges of the front and rear sides of the insulating resin plate 104 face the notch 101 and tilt spring notch 102, respectively. The thickness of the insulating resin plate 104 is greater than the portions other than the insulating resin plate 104 in the base plate portion 100a, and the surface of the insulating resin plate is in a higher position than the periphery thereof. Contact terminals 105 are exposed in the surface of the insulating resin plate 104, and the exposed surface of the contact terminals 105 are gold plated. The contact terminals 105 are arranged in the form of a matrix having two rows in the lengthwise direction of the base plate portion 100a and three rows in the crosswise direction, are isolated from each other, and are insulated from each other by the insulating resin plate 104. The contact terminals 105 are connected to the terminals of the SIM card 2.

A slide groove 106 that extends in the lengthwise direction is formed in the side plate portions 100b in an area constituting substantially ⅔ of the rear side (the tilt spring notch 102 side). A rectangular tilt groove 107 is formed in the end portion of the front side (the notch 101 side) of the slide groove 106, and is in communication with the slide groove 106. The tilt groove 107 extends upward from the slide groove 106, and extends across a portion of the upper plate portion 100c. The tilt groove 107 is disposed further to the rear side from the front side edge of the base plate portion 100a.

The portion even further to the front side from the tilt groove 107 in the side plate portions 100b is positioned further outside of other portions. The externally positioned portion constitutes about ¼ of the entire side plate portions 100b and substantially matches the portion in which the notch 101 in the base plate portion 100a is formed. The portion in which the notch 101 of the connector main body 100 is formed thereby extends further outward from the other portions. A fixed portion 108 extending outward from the side plate portions 100b is provided to the lower end portion of the read side end of the externally positioned portion in the side plate portions 100b. Also, a rectangular lock groove 109 is formed in the end portion of the front side in the boundary area between the side plate portions 100b and upper plate portion 100c.

The inside portion in the end portion of the rear side of the upper plate portion 100c is folded downward along the fold line that extends in the crosswise direction and forms a stopper 110. The width of the stopper 110 in the crosswise direction is substantially half that of the upper plate portion 100c, the length in the vertical direction of the stopper 110 is substantially half the height of the side plate portions 10b, and the position of the stopper 110 in the lengthwise direction substantially matches the position of the front side edge in the tilt spring notch 102. Also, the portion that is further to the front side from the stopper 110 in the upper plate portion 100c is a guide 111.

Portions other than the insulating resin plate 104 in the connector main body 100 are formed from a thin plate composed of a metal or a metal alloy in order to assure strength and a thinner profile, a stainless steel plate, for example, is formed to a thickness of 0.3 mm. The portions other than the insulating resin plate 104 may be formed from phosphor bronze or the like. The surface of the fixed portions 103 and 108 are gold plated in order to assure solder wettability during mounting.

The configuration of the tray 200 will be described next. The tray 200 is composed of a base plate portion 200a, and a pair of side plate portions 200b that stands upwardly erect from the long side portion of the base plate portion 200a, as shown in FIG. 3. The long side of the base plate portion 200a has two edges that extend in the movement direction of the tray 200. The upper surface of the base plate portion 200a forms a mounting surface for mounting a SIM card 2. The length of the side plate portions 200b in the lengthwise direction is greater than the length of the base plate portion 200a, and the two ends in the lengthwise direction of the side plate portions 200b protrude further outward in the lengthwise direction than the base plate portion 200a.

A contact notch 201 is formed in the base plate portion 200a in the rear side, i.e., the side corresponding to the tilt spring notch 102 of the connector main body 100. The shape of the contact notch 201 is a rectangular shape with rounded corners, and the length in the lengthwise direction is about ¾ the length of the entire base plate portion 200a. The contact notch 201 is a portion in which the insulating resin plate 104 of the connector main body 100 is fitted when the tray 200 has advanced inside the connector main body 100, i.e., when the tray is in the advanced position. The contact terminals 105 can thereby be connected to the terminals of the SIM card 2 (see FIG. 1).

The two ends in the crosswise direction in the end portion of the rear side of the base plate portion 200a are folded upward along the fold line extending in the crosswise direction, and form a pair of card brackets 202. The portion that is further to the rear side from the card receptors 202 in the portion between one card bracket and the contact notch 201 is curved in a sinuate form and constitutes a tilt spring 203. A tilt spring is not provided between the contact notch 201 and the other card bracket 202, and the edge of the other card bracket 202 constitutes the edge of the contact notch 201. The shape of the tray 200 is therefore different from the connector main body 100 and does not have plane symmetry.

A notch 204 is formed in the center area in the crosswise direction in the front side edge of the base plate portion 200a. The position of the notch 204 in the crosswise direction is the same position as the contact notch 201. The base plate portion 200a is triangularly cut away in the front side end portion of the base plate portion 200a on the end portion of the side in which the tilt spring 203 is provided, and this cutaway portion forms a cutout 205. This cutout 205 is a portion that corresponds to the cutaway portion of the SIM card 2 when the SIM card 2 is mounted (see FIG. 1). The portions other than the notch 204 in the end portion of the front side of the base plate portion 200a are folded upward to form card brackets 206. The card brackets 202 and 206 are provided so as to conform to the external shape of the SIM card 2.

A slide pawl 207 is provided to the upper end of the end portion of the rear side of each of the pair of the side plate portions 200b. The slide pawls 207 extend in mutually opposing directions, i.e., in the outward direction, which is the direction orthogonal to the movement direction of the tray and is a direction parallel to the SIM card mounting surface of the base plate portion 200a. The slide pawls 207 fit into the slide groove 106 of the connector main body 100, move in the lengthwise direction inside the slide groove 106, and fit into the tilt groove 107 and move upward when the tray 200 is in the pulled-out position. The tilt groove 107 and slide pawls 207 constitute the inclining means. The thickness of the slide pawls 207 is slightly less than the width of the slide groove 106, and for this reason, there is a clearance between the slide pawls 207 and the slide groove 106 and the slide pawls 207 can slide in the lengthwise direction while remaining fitted in the slide groove 106. The lower end portion of the center area in the lengthwise direction of the side plate portions 200b is cut away to form a tilt notch 208 that extends in the lengthwise direction.

Substantially ⅓ of the portion on the front side of the side plate portions 200b is positioned further outward from the other portions of the side plate portions 200b. This portion is not connected to the base plate portion 200a and constitutes a lock hinge 209. The lock hinge 209 is thereby configured so as to elastically deform along the crosswise direction. The lock hinge 209 is accommodated in the portion that extends outward in the connector main body 100 and is configured to outwardly press the side plate portions 100b of the connector main body 100 when the tray 200 is in the advanced position. A pair of lock hinges 209 is provided in a symmetric manner.

An outward-extending lock pawl 210 is provided to the upper end in the vicinity of the end portion of front side of the lock hinge 209. The lock pawl 210 fits into the lock groove 109 of the connector main body 100 when the tray 200 is in the advanced position. The end portion of the front side of the lock hinge 209 is folded outward along the fold line extending in the vertical direction and constitutes a lock tab 211. The corners of the lock tab 211 are chamfered.

The tray 200 is formed from a stainless steel spring material in order to assure strength and spring characteristics. The thickness of the tray is, e.g., 0.2 mm. The contact terminals 105 require a certain amount of space for preserving spring characteristics in order for contact pressure to be maintained as contact points using the elastic spring force of the contact terminals, and structural space is required in order to form the contact terminals 105. For this reason, a gap of about 0.5 mm, for example, is required as the height from the mounting surface of the card connector 1 to the contact point of the SIM card 2. In the present embodiment, the thickness of the portions other than the insulating resin plate 104 in the connector main body 100 is set to, e.g., 0.3 mm, and the thickness of the tray 200 is set to, e.g., 0.2 mm, whereby the total thickness of the base plate portion 100a of the connector main body 100 in the portions other than the insulating resin plate 104 and the base plate portion 200a of the tray 200 is set to, e.g., 0.5 mm, and is set to be equal to the height of the contact terminals 105. The space required for the contact terminals 105 is thereby assured, and the thickness of the card connector 1 is set to a minimal thickness.

Figure 4:
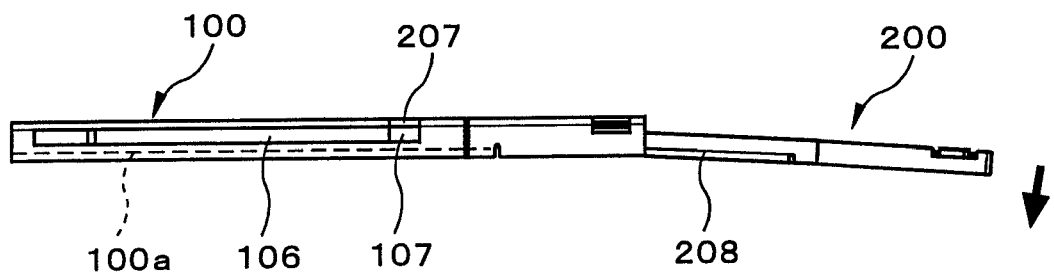
FIG. 4 is a side view showing a state in which the tray has been pulled out in the card connector according to the present embodiment.

The operation of the card connector according to the present embodiment configured in the manner described above will be described next. FIG. 4 is a side view showing the state in which the tray has been pulled out in the card connector according to the present embodiment. FIGS. 5A to 5C and FIGS. 6A and 6B are perspective views showing, as a sequence of steps, the operation for mounting a card in the card connector according to the present embodiment. FIG. 7 is a perspective view showing the state in which a card has been mounted in the card connector according to the present embodiment.

Described first with reference to FIGS. 1 to 3 is the state in which the tray 200 is in the advanced position and has advanced inside the connector main body 100. At this time, a SIM card has not been inserted into the card connector 1. The connector main body 100 is mounted on a mounting board by the fixed portions 103 and 108 being soldered onto the mounting surface of the mounting board (not shown), and is fixed inside the electronic device. The tray 200 is fixed to the connector main body 100 by fitting the lock pawl 210 of the tray 200 into the lock groove 109 of the connector main body 100. At this point, the slide pawls 207 are fitted to the end portion of the rear side of the slide groove 106, and the lock tab 211 protrudes outward so as to extend around the front side edge of the side plate portions 10b.

The operation for drawing the tray 200 out from the advanced position will be described next. First, the lock tab 211 of the tray 200 is pressed inward, the lock hinge 209 elastically deforms inward, and the lock pawl 210 is disengaged from the lock groove 109 of the connector main body 100 and directly drawn to the front side. The slide pawls 207 thereby remain fitted in the slide groove 106 and slide to the front side along the slide groove 106. At this time, the tilt spring 203 presses the base plate portion 100a of the connector main body 100 downward and the rear side portion of the tray 200 is therefore urged upward by the counteraction of the tilt spring. The movement of the slide pawls 207 in the vertical direction is restricted by the slide groove 106, and the base plate portion 200a of the tray 200 therefore moves while the parallel urging force against the base plate portion 10a of the connector main body 100 is maintained.

When the slide pawls 207 reach the tilt groove 107 formed in the front side portion of the slide groove 106, as shown in FIG. 4, the restraint on the movement of the slide pawls 207 in the upward direction is no longer present, and the slide pawls 207 are therefore guided into the tilt groove 107 by the urging force of the tilt spring 203 and move upward, i.e., in the direction away from the base plate portion 100a. At this point, the front side portion of the tray 200, i.e., the portion drawn from the connector main body 100 moves downward by its own weight. Since the tilt groove 107 is disposed further to the rear side of the front side edge of the base plate portion 100a, the base plate portion 200a of the tray 200 is in contact with the rear side edge in the base plate portion 100a of the connector main body 100, i.e., the rear side edge of the notch 101, and the tray 200 rotates about this edge acting as a support. In this case, a tilt notch 208 is formed in the side plate portions 200b of the tray 200 and the side plate portions 200b therefore do not interfere with the connector main body 100.

The slide pawls 207 latch onto the upper end portion of the tilt groove 107, whereby the tray 200 is fixed in a sloped state with respect to the connector main body 100, i.e., in a tilted state. The position of the tray 200 at this time is the pulled-out position. At this point, the entire tray 200 has not been pulled out, but rather only a portion of the tray has been pulled out. The tray 200 is sloped in the movement direction of the tray so that the gap between the upper plate portion 100c in the connector main body 100 and the card mounting surface in the tray 200 is increased, the mounting surface of the SIM card 2 opened, and the SIM card 2 can therefore be mounted.

Figure 5A:
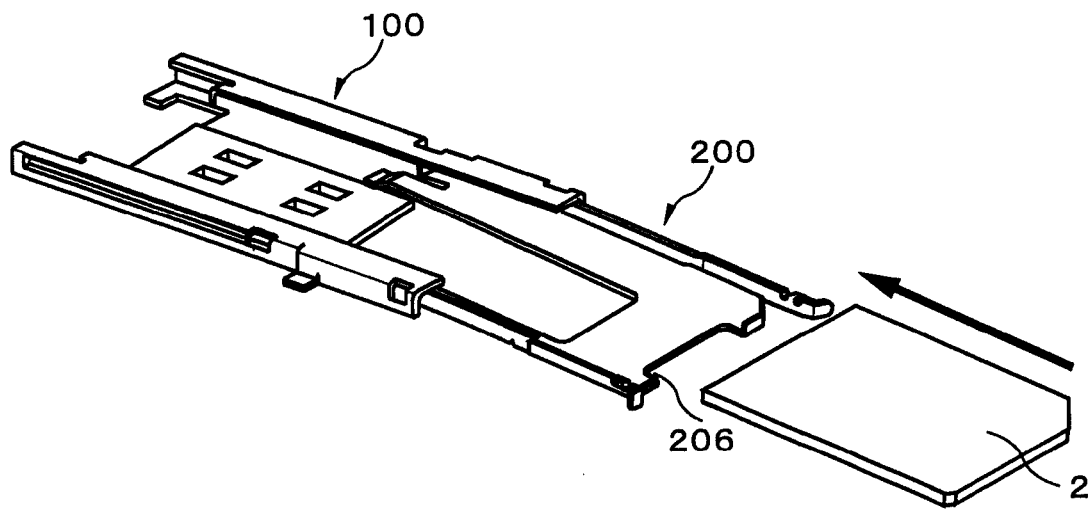
FIGS. 5A to 5C are perspective views showing, as a sequence of steps, the operation for mounting a card in the card connector according to the present embodiment.
Figure 5B:
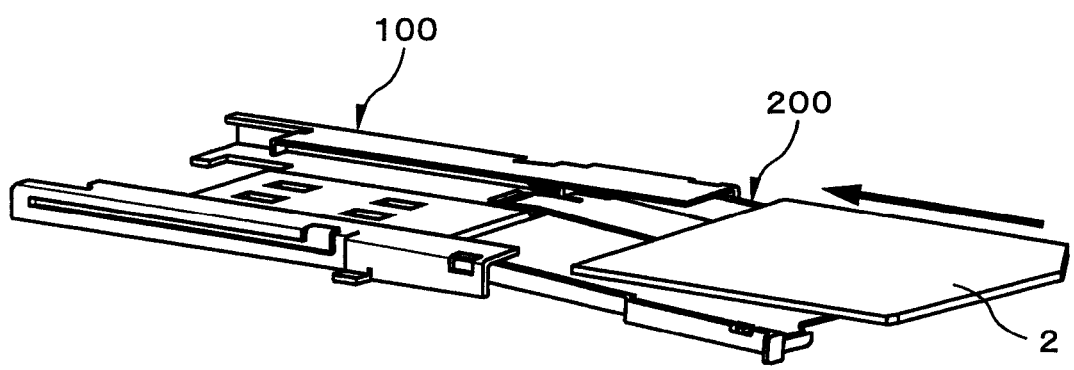
Figure 5C:
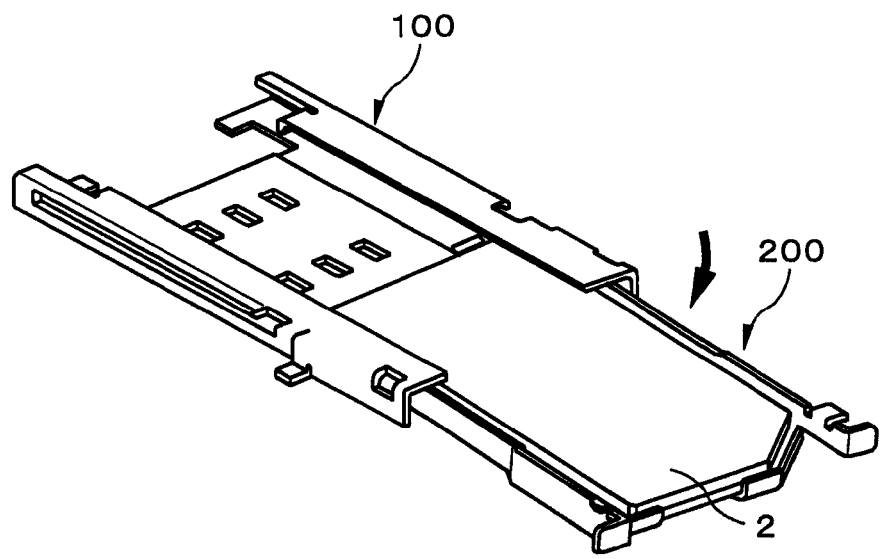
Figure 6A:
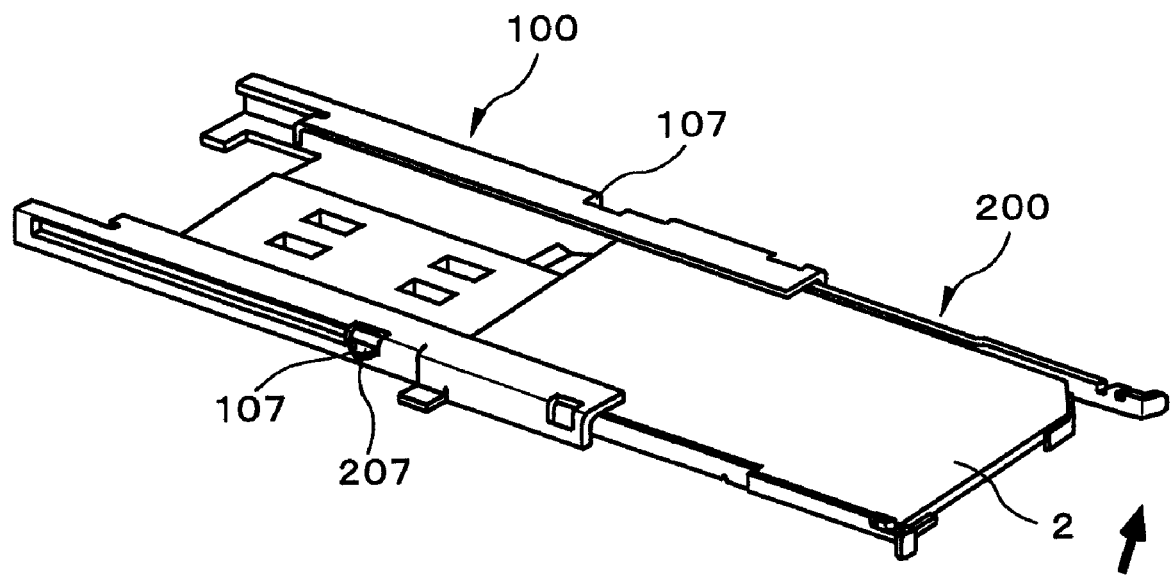
FIGS. 6A and 6B are perspective views showing, as a sequence of steps, the operation for mounting a card in the card connector according to the present embodiment, and show the steps that follow FIG. 5C.

Next, the SIM card 2 is mounted in an area enclosed by the card brackets 202 and 206 in the upper surface of the tray 200, and is arranged in the tray 200, as shown in FIG. 5A to 5C. At this point, since the tray 200 is fixed to the connector main body 100, the mounting of the SIM card 2 does not therefore cause the tray 200 to move and advance into the connector main body 100 and make the mounting of the SIM card more difficult.

The slope angle of the tray 200 in the pulled-out position in relation to the connector main body 100, i.e., the tilt angle, is determined by the depth of the stopper 110 in the connector main body 100, i.e., length in the lengthwise direction. It is more advantageous for the tilt angle of the tray 200 to be large in order to facilitate the mounting of the SIM card, but if the tilt angle is too large, the tray will make contact with the mounting board (not shown) disposed below the card connector 1 and on which the card connector 1 is mounted. For this reason, the tilt angle of the tray 200 is, e.g., 2 to 3°, and is preferably about, e.g., 2.0 to 2.5°. When the tilt angle is 2 to 3°, the depth of the stopper 110 is set to about, e.g., 8 mm. The tilt angle can be controlled by forming the stopper 110 to a sufficient depth and adjusting the extent of the notching of the tilt notch 208.

Next, the tray is made to advance into the connector main body 100 by an action that is the reverse of that for drawing out the tray as described above. Specifically, first, the front side end portion of the tray 200 is pushed upward and the tray 200 is set parallel to the connector main body 100, as shown in FIG. 6A. The slide pawls 207 thereby move downward into the tilt groove 107 and the fixed state of the slide pawls 207 is released. At this stage, the movement of the SIM card 2 in the lengthwise direction is already restricted by the card brackets 202 and 206 of the tray 200, movement in the crosswise direction is restricted by the side plate portions 200b, and movement in the vertical direction is restricted by the guide 111 of the connector main body 100 and the base plate portion 200a. Therefore, the SIM card 2 does not fall out of the tray 200.

Figure 6B:
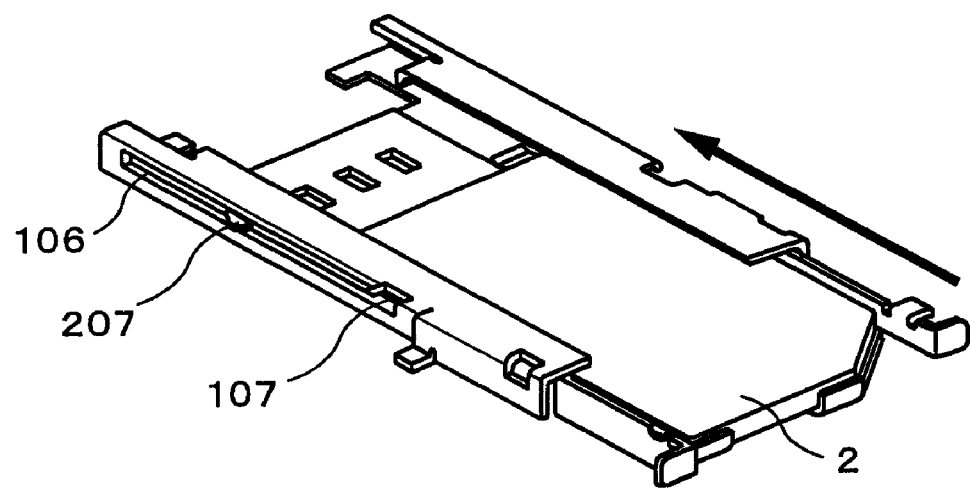
Figure 7:
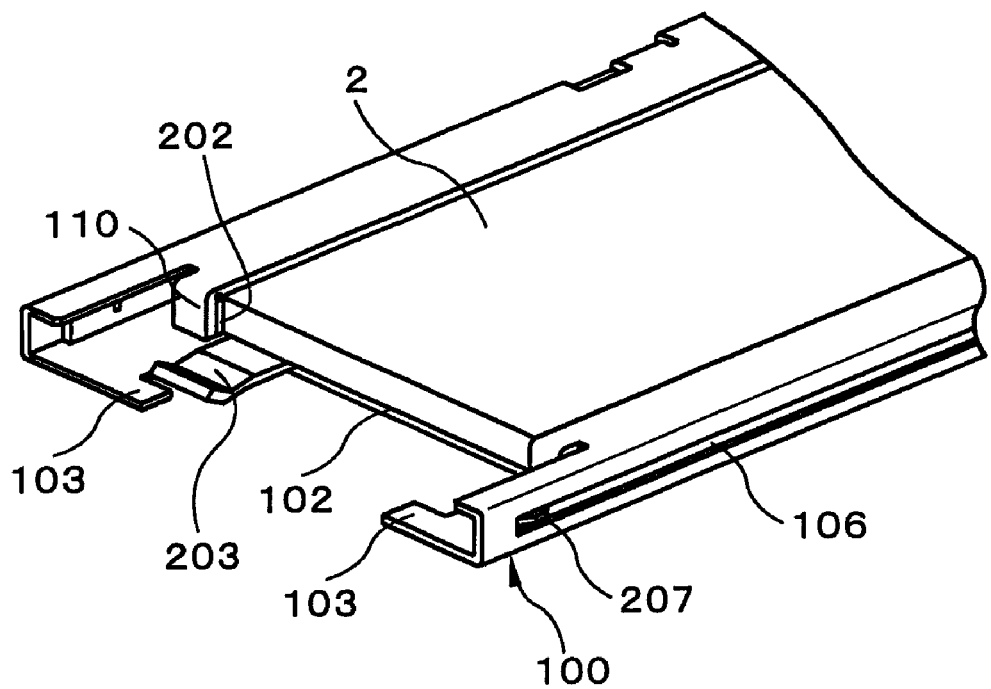
FIG. 7 is a perspective view showing a state in which a card has been mounted in the card connector according to the present embodiment.

Next, the tray 200 is pressed to the rear side and inserted into the connector main body 100 while the orientation of the tray 200 is kept parallel to the connector main body 100, as shown in FIG. 6B. At this point, the slide pawls 207 moves while sliding inside the slide groove 106.

When the tray 200 arrives at the advanced position, the card brackets 202 of the tray 200 make contact with the stopper 110 of the connector main body 100, and the movement of the tray 200 is stopped, as shown in FIG. 7. The lock pawl 210 fits into the lock groove 109, and the tray 200 is fixed (locked) to the in the connector main body 100. When the tray 200 is positioned in the advanced position, the SIM card 2 is connected to the internal circuitry of the electronic device via the contact terminals 105. Once the tray 200 has been locked, the lock is not released as long as the lock tab 211 is not operated, and the tray 200 therefore does not move in the connector main body 100. For this reason, the SIM card 2 does not become disengaged from the card connector 1 and contact failures do not occur even if an impact load is applied to the card connector 1 due to dropping or the like.

When the tray 200 arrives at the advanced position, the movement of the tray 200 is stopped when the card brackets 202 make contact with the stopper 110. The slide pawls 207 therefore do not protrude into the end portion of the slide groove 106 and the slide pawls 207 are not damaged. The SIM card 2 is also not damaged because the SIM card 2 is accommodated and protected inside the tray 200.

When the tray 200 is in the advanced position, the tilt spring 203 of the tray 200 is positioned inside the tilt spring notch 102 of the connector main body 100, as shown in FIG. 7. Therefore, a load is not applied to the tilt spring 203 and the strain on the tilt spring 203 is released. As a result, the tilt spring 203 can be prevented from being permanently deformed and degraded through bearing loads applied thereto over a long period of time.

The tray 200 is moved from the advanced position to the pulled-out position by the same operation as that described above when the SIM card 2 is removed from the card connector 1, whereby the tray 200 slopes in relation to the connector main body 100 so that the gap between the card mounting surface of the tray 200 and the upper plate portion 100c increases and the state of the tray is locked. The SIM card 2 is then removed from the tray 200. The tray 200 is thereafter moved from the pulled-out position to the advanced position and locked in the advanced position by using the same operation as that described above.

The effect of the present embodiment is described next. First, the card connector according to the present embodiment is an insertion type card connector rather than a vertical contact-type card connector. Therefore, a large opening is not required in the casing of the electronic device in which the card connector is mounted. For this reason, the degree of freedom in designing the electronic device is not reduced. Since the SIM card does not need to be accommodated on the reverse side of a secondary battery, the problem in which the SIM card cannot be inserted or withdrawn unless the secondary battery is removed does not occur.

Second, in the present embodiment, the insertion, removal, retention, and electrical connection of the SIM card can be assured and the SIM card can be protected via a simple configuration without providing projections and grooves for inserting and removing the SIM card because a tray is used to insert and withdraw the card. For this reason, the card connector can be made smaller and thinner.

Third, in the present embodiment, the card can be easily inserted and withdrawn because the card mounting surface of the tray slopes (tilts) so as to move away from the upper plate portion 100c of the connector main body 100 when the tray is in the pulled-out position, and the card mounting surface opens. For this reason, the card can be inserted and withdrawn from the tray without the use of excessive force. Therefore, the risk of the card being damaged is reduced. Force applied when the tray is inserted or removed is applied to the tray rather than the card itself, and the danger of the card being damaged can therefore be further reduced.

Fourth, since the tray tilts in the pulled-out position, the length required for drawing out the tray when inserting and withdrawing a card can be reduced to a short distance. In other words, the surface area required for accommodating the card can be reduced without needing to make the drawer portion of the tray larger than the external dimensions, and the card connector can be made smaller.

Fifth, a large portion of the card connector is formed from a metal or an alloy, whereby the thickness of the base plate portion of tray and the connector main body can be reduced to the thickness required for the contact point terminals. Therefore, the card connector can be made thinner.

Sixth, the card can be assuredly held, electrically connected, and reliably protected because the tray is fixed (locked) in the advanced position. A slide groove is formed in the connector main body, and therefore the tilt pawl is fixed (locked) in the tilt groove when the tray is in the pulled-out position, and the ease of operation is very good in that the tray does not move when the card is placed in the tray. Also, since the tray does not separate from the connector main body, the tray is not liable to be lost.

Figure 8:
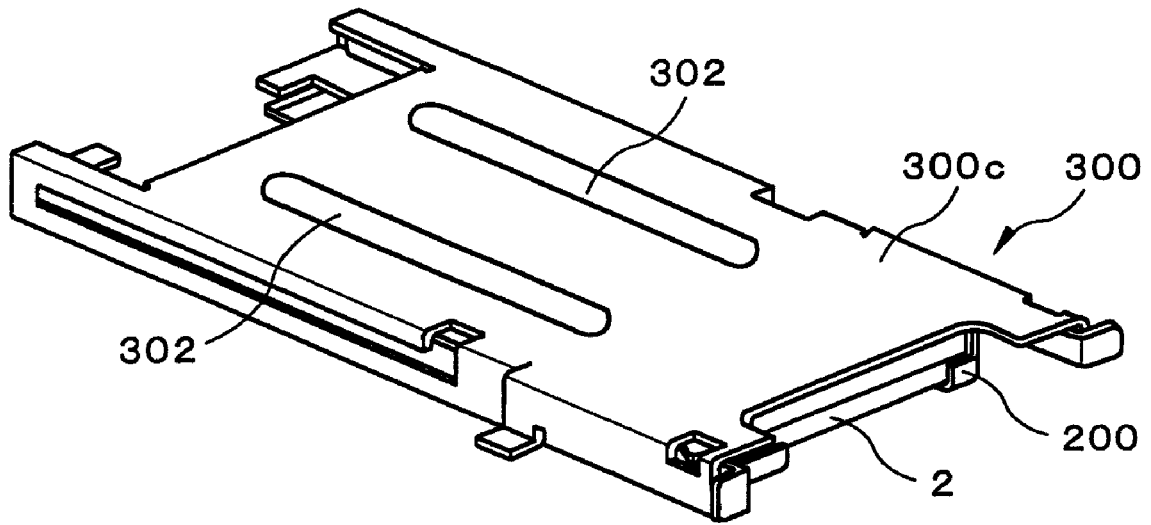
FIG. 8 is a perspective view showing the card connector according to a second embodiment of the present invention.
Figure 9:
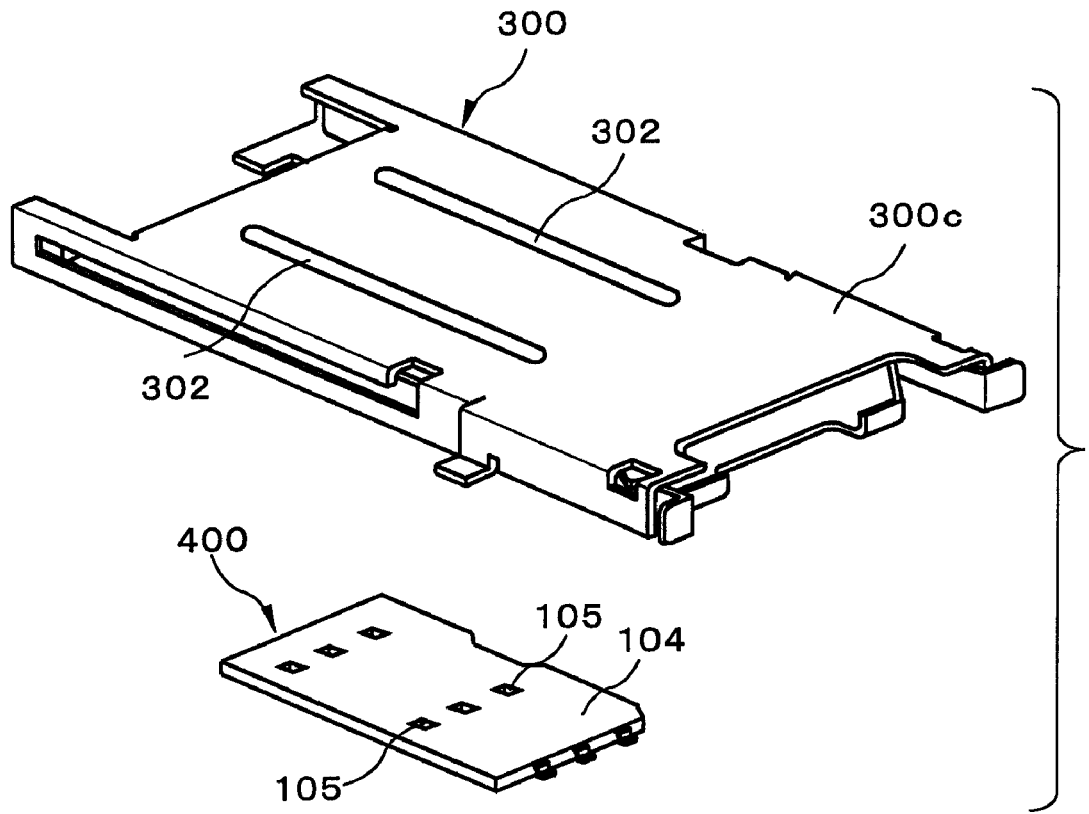
FIG. 9 is an exploded perspective view showing the card connector according to the present invention.
Figure 10:
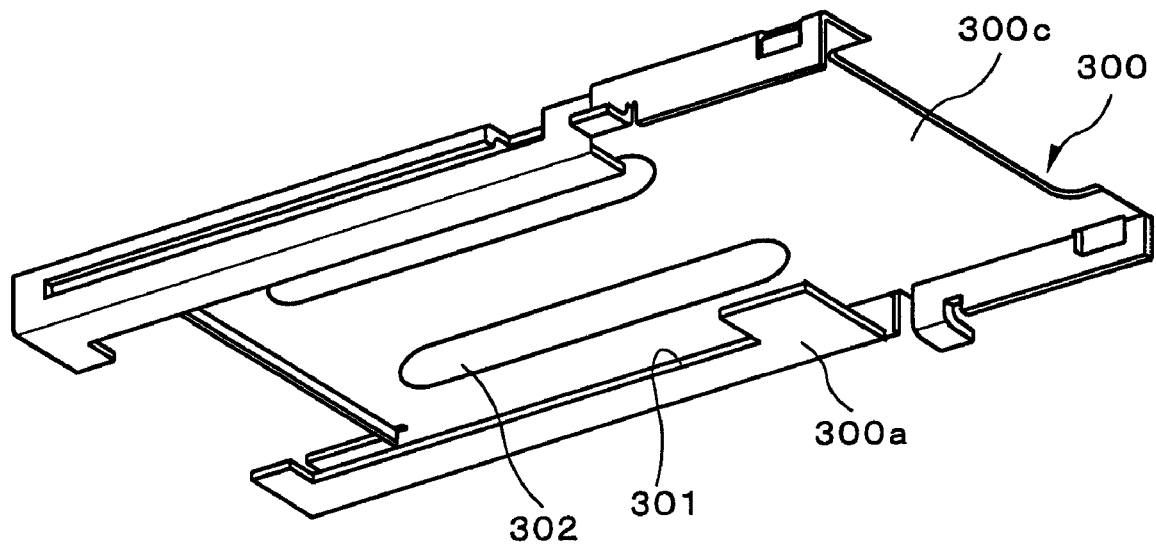
FIG. 10 is a perspective view as seen from below the connector main body of the card connector according to the present embodiment.

Embodiment 2 of the present invention will be described next. FIG. 8 is a perspective view showing the card connector according to the present embodiment; FIG. 9 is an exploded perspective view of the card connector; and FIG. 10 is a perspective view as seen from below the connector main body of the card connector. The terminal contact points and insulating resin plate are separate from the connector main body and are separate components in the card connector according to the present embodiment, as shown in FIGS. 8 to 10.

In other words, in the present embodiment, a connector main body 300 and a contact point component 400 are provided in place of the connector main body 100 in the first embodiment described above. A contact component notch 301 is formed in the base plate portion 300a of the connector main body 300 and the contact point component 400 is configured so as to be fitted into the contact component notch 301. An upper plate portion 300c of the connector main body 300 is in the shape of a single continuous plate, and two holding ribs 302 that extend in the lengthwise direction are formed thereon. The holding ribs 302 are worked and formed so that the upper plate portion 300c protrudes downward, i.e., to the base plate portion 300a side. Contact terminals 105 and an insulating resin plate 104 in which the contact terminals 105 are embedded are disposed in the contact point component 400. The configuration other than that described above in the present embodiment is the same as that in Embodiment 1 described above.

In the present embodiment, the contact point component 400 is designed to be a multipurpose component. This is achieved by separating the connector main body 300 and the contact point component 400, and the connector main body 300 can be separately designed in accordance with the specification of the electronic device in which the card connector is mounted. Various demands can thereby be satisfied without considerably increasing costs.

In terms of manufacturing, the upper plate portion 300c of the connector main body can be a single continuous plate-shaped member by making the connector main body 300 and the contact point component 400 separate components. The strength of the connector main body is thereby increased, and the connection reliability can be improved. Since the holding ribs 302 can be formed on the upper plate portion 300c, the SIM card 2 can be pressed from above toward the contact point component 400. The force applied from the contact terminals 105 of the contact point component 400 to the SIM card 2 can be received by the connector main body 300 without applying a load to the SIM card 2. As a result, the load applied to the SIM card 2 can be further reduced.

In the present embodiment, the accuracy of the positional relationship between the connector main body 300 and contact point component 400 depends on the mounting precision of the components because the connector main body 300 and contact point component 400 are mutually independently mounted on the mounting board (not shown). However, since the contact point terminals of the SIM card are sufficiently large, the accuracy of the required positional relationship is in a range that is sufficiently satisfied by the precision of multi-purpose component mounted devices. The operations and effects other than those described above in the present embodiment are the same as those in the first embodiment described above.

Figure 11:
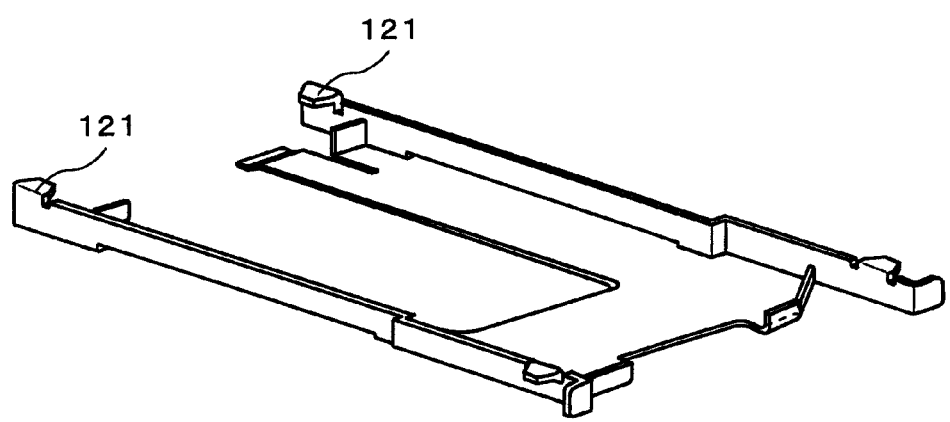
FIG. 11 is a perspective view showing the tray of the card connector according to the third embodiment of the present embodiment.
Figure 12:
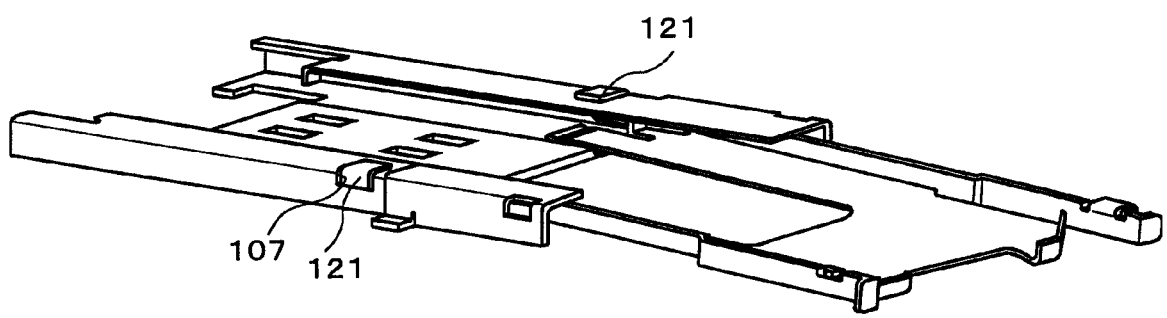
FIG. 12 is a side view showing the state in which the tray has been pulled out in the card connector according to the present embodiment.

Embodiment 3 of the present invention will be described next. FIG. 11 is a perspective view showing the tray of the card connector according to the present embodiment; and FIG. 12 is a side view showing the state in which the tray has been pulled out in the card connector according to the present embodiment. In comparison with Embodiment 1 described above, the slide groove 106 of the connector main body (see FIG. 2) and the slide pawls 207 of the tray (see FIG. 3) are not provided in the present embodiment. Instead, a pair of tilt pawls 121 that extend inward is provided to the upper end portion of the front side end portion of the tray, as shown in FIG. 11. The configuration other than that described above in the present embodiment is the same as that in Embodiment 1 described above.

The operation of the present embodiment will be described next. In the present embodiment, a slide groove and a slide pawl are not provided. Therefore, the slide pawl is not fitted into a slide groove; instead, the side plate portions 200b of the tray move by being guided by the base plate portion 100a of the connector main body, the side plate portions 100b, and the guide 111. At this point, the tilt pawls 121 make contact with the guide 111 and are restricted from moving upward. When the tray arrives at the pulled-out position, the tilt pawls 121 of the tray fit into the tilt groove 107 to allow upward movement. The tray thereby rotates about the front side edge of the base plate portion 100a of the connector main body, and slopes in a direction in which the card mounting surface of the tray moves away from the upper plate portion 100c of the connector main body in accordance with the same operation as in the first embodiment described above. When the tray is in the pulled-out position, the tray moves parallel to the connector main body, whereby the tilt pawls 121 can be disengaged from the tilt groove 107, and the tray can be removed from the connector main body by further drawing out the tray from this state. The operation other than that described above in the present embodiment is the same as that in Embodiment 1 described above.

In the present embodiment, the tray may be removed from the connector main body, which is different from the arrangement is Embodiment 1 described above. Also, the length that the tray can be pulled out can be increased because a slide grove is not required. The present embodiment is particularly effective for cases in which a considerably draw-out length is desired for the tray due to the shape of the casing of the electronic device. The effects other than those described above in the present embodiment are the same as those of Embodiment 1 described above.

In Embodiments 1 and 2 described above, the components of the card connector may be formed from a resin material.

In this case, an increase in the thickness of the card connector can be greatly reduced by using the mounting board (not shown) on which the connector main body is mounted as a structural material of the card connector. Costs can thereby be reduced even if the thickness and mounting surface area of the card connector are increased.

In the embodiments described above, the tilt groove 107 may be disposed further to the front side than the front side edge of the base plate portion 100a and may be used to guide the slide pawls 207 downward.

Embodiment 4 of the present invention will be described next. The present embodiment is an embodiment of an electronic device in which the card connector according to any of the embodiments described above is mounted. The electronic device according to the present embodiment is a mobile communication device, for example, and is a so-called mobile phone, for example. In this mobile communication device, a mounted card connector is used, and a SIM card 2 on which subscriber information is recorded can be inserted and removed. A plurality of communication devices can thereby be used by the same subscriber, and a plurality of subscribers can use a single communication device as their own dedicated communication device.

In the present embodiment, a mobile communication device was described as an example of an electronic device, but the present invention is not limited thereto. Other possible applications include digital cameras, digital video cameras, PDAs (Personal Digital Assistance), notebook personal computers, and other electronic devices. Also, the card that is to be inserted or removed is not limited to a SIM card. Examples of cards other than SIM cards include IC cards and memory cards, and application can also be widely made to cards that input and/or output electronic information between electronic devices.

INDUSTRIAL APPLICABILITY

The present invention can be advantageously used in card connectors for inserting and removing cards that input and/or output the electronic information of SIM cards or the like in, e.g., mobile communication devices, digital cameras, digital video cameras, PDAS, notebook personal computers, and other electronic devices, and can also be used in electronic devices in which the card connector is mounted.

The invention claimed is:

1. A card connector provided at an electronic device, the card connector configured for inserting a card having recorded electronic information in the electronic device and for withdrawing the card from the electronic device, the card connector comprising:
    a connector main body;
    a tray having a tilt spring that is movably disposed with respect to said connector main body between a pulled-out position in which a portion of the tray is pulled out from said connector main body and an advanced position in which a portion of the tray is advanced into said connector main body; and an inclining means for inclining said tray in the movement direction of said tray so that a gap between said connector main body and a card mounting surface of said tray increases when said tray is in said pulled-out position, wherein said pulled-out position is a position that allows said card to be mounted on the card mounting surface of said tray, wherein said inclining means comprises:

a pawl disposed in said tray and extended outward in a direction that intersects with the movement direction of said tray; and a tilt groove formed in a side of said connector main body and directed perpendicular to said card mounting surface, into which said pawl fits when said tray is in said pulled-out position, and which inclines said tray by guiding said pawl in a direction perpendicular to said card mounting surface; and wherein said connector main body comprises:

a first base plate portion disposed below said tray.

2. The card connector according to claim 1, wherein said advanced position is a position in which said card is connected to an internal circuitry of said electronic device.

3. The card connector according to claim 1, wherein a slide groove is formed extending along the movement direction of said tray in said connector main body; the distal end on said pulled-out position side of the tray is in communication with said tilt groove, and, when said tray moves between said advanced position and said pulled-out position, said tray is guided via the movement of said pawl within the slide groove while engaged therein.

4. The card connector according to claim 1, wherein said connector main body comprises:

a pair of first side plate portions that stand upwardly erect from two edges that extend in the movement direction of said tray in the first base plate portion; and an upper plate portion extended inward from the upper end of the first side plate portions;

said tray comprises:

a second base plate portion in which the upper surface thereof constitutes said card mounting surface; and a pair of second side plate portions stand upwardly erect from two edges that extend in the movement direction of said tray in the second base plate portion;

said tilt groove is formed from said first side plate portion across said upper plate portion, and guides said pawl in a direction away from said first base plate portion;

said pawl is formed on said second side plate portion;

said first side plate portion and said upper plate portion extend further to said pulled-out position side from said first base plate portion; and the edge on said pulled-out position side in said first base plate portion is disposed further to said pulled-out position side than said tilt groove.

5. The card connector according to claim 4, wherein said tray comprises an elastic member for urging the portion where said pawl is disposed in said tray toward a direction away from said first base plate portion when the tray is in said pulled-out position.

6. The card connector according to claim 5, wherein said elastic member is a spring member provided to said second base plate portion.

7. The card connector according to claim 1, wherein a lock groove is formed in said connector main body, and a lock pawl that fits into said lock groove when the tray is in said advanced position is provided to said tray.

8. The card connector according to claim 2 wherein said connector main body comprises a plurality of contact point terminals for connecting terminals of said card to said internal circuitry; and an insulation plate in which the plurality of contact point terminals is embedded and which insulates said plurality of contact point terminals from each other; and that notches are formed in positions that correspond to the terminals of said card in said tray.

9. A card connector provided at an electronic device, the card connector configured for inserting a card having recorded electronic information in the electronic device and for withdrawing the card from the electronic device, the card connector comprising:

a connector main body;

a tray that is movably disposed with respect to said connector main body between a pulled-out position in which a portion of the tray is pulled out from said connector main body and an advanced position in which a portion of the tray is advanced into said connector main body; and an inclining means for inclining said tray in the movement direction of said tray so that a gap between said connector main body and a card mounting surface of said tray increases when said tray is in said pulled-out position, wherein said inclining means comprises:

a pawl disposed in said tray and extended outward in a direction that intersects with the movement direction of said tray; and a tilt groove formed on said connector main body and directed perpendicular to said card mounting surface, into which said pawl fits when said tray is in said pulled-out position, and which inclines said tray by guiding said pawl in a direction perpendicular to said card mounting surface;

wherein said connector main body comprises:

a first base plate portion disposed below said tray;

a pair of first side plate portions that stand upwardly erect from two edges that extend in the movement direction of said tray in the first base plate portion; and an upper plate portion extended inward from the upper end of the first side plate portions;

said tray comprises:

a second base plate portion in which the upper surface thereof constitutes said card mounting surface; and a pair of second side plate portions stand upwardly erect from two edges that extend in the movement direction of said tray in the second base plate portion;

said tilt groove is formed from said first side plate portion across said upper plate portion, and guides said pawl in a direction away from said first base plate portion;

said pawl is formed on said second side plate portion;

said first side plate portion and said upper plate portion extend further to said pulled-out position side from said first base plate portion; and the edge on said pulled-out position side in said first base plate portion is disposed further to said pulled-out position side than said tilt groove.

* * * * *